S. COULIER.
MOTOR VEHICLE AND THE LIKE.
APPLICATION FILED JULY 30, 1921.

1,433,072.

Patented Oct. 24, 1922.

Inventor
Sylvain Coulier,
by Emil Bonnelycke
Attorney

Patented Oct. 24, 1922.

1,433,072

UNITED STATES PATENT OFFICE.

SYLVAIN COULIER, OF SCHAERBEEK, NEAR BRUSSELS, BELGIUM.

MOTOR VEHICLE AND THE LIKE.

Application filed July 30, 1921. Serial No. 488,657.

*To all whom it may concern:*

Be it known that I, SYLVAIN COULIER, a subject of the King of Belgium, residing at Schaerbeek, near Brussels, Belgium, have invented certain new and useful Improvements in or Relating to Motor Vehicles and the like, of which the following is a specification.

This invention relates to motor vehicles and the like and refers more particularly to the front trucks of such vehicles.

The invention has for its main object to provide improved means of supporting the front truck and the motor mechanism.

The arrangement forming the subject of the present invention is distinguished from the known devices by carrying a differential connected by means of two transverse shafts with universal joints to the wheels of the vehicle directly or through the intermediary of toothed gearings.

The application of this mode of transmission to motor vehicles provided with front trucks enables the motor, the change speed gear and the differential to be grouped in a compact unit which may be secured under the front truck and near the front axle; thereby leaving free the space beneath the axle.

This disposition renders the front truck completely removable and applicable to all kinds of vehicles.

The disposition of the present invention can be applied to all kinds of motors.

The invention is illustrated by way of example in the accompanying drawings wherein:—

Figure 1:
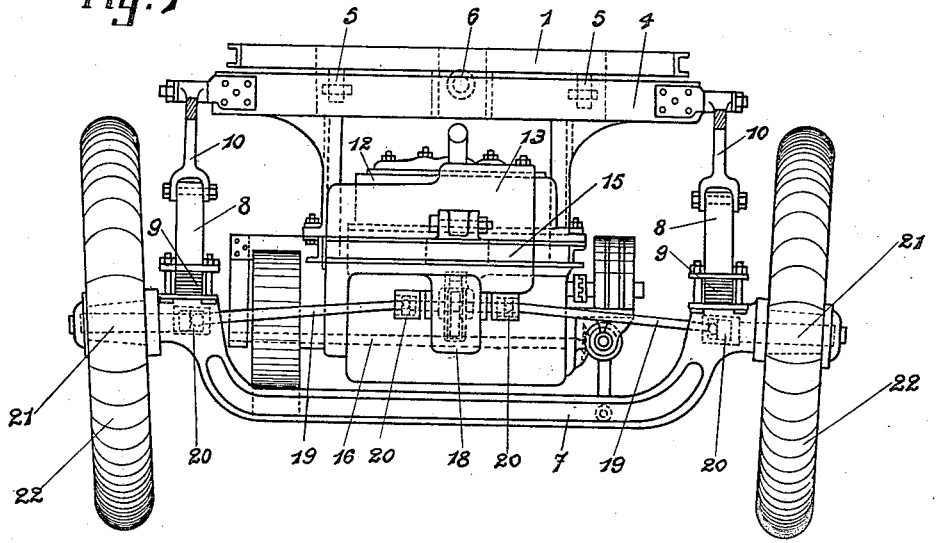
Fig. 1 is a front view (the radiator is removed).
Figure 2:
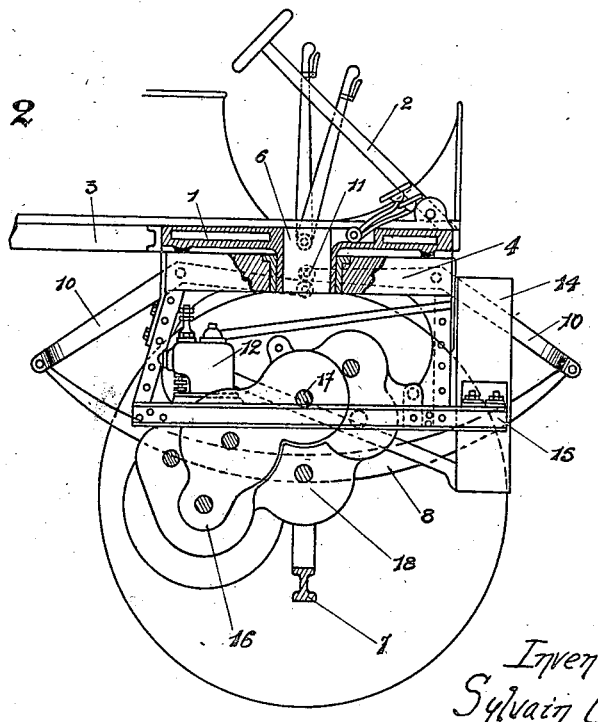
Fig. 2 is a side view partly in section of the motor mechanism and front truck.

The front truck illustrated in Figs. 1 and 2 comprises an upper fixed part 1 supporting the steering column 2, pedals and control levers of the motor and its adjuncts. This part 1 is fixed to the frame 3 of the vehicle and is supported on a lower part 4 by means of rollers 5 and carries a hollow sleeve 6 on which the two parts 1 and 4 are centrally mounted. The controlling transmission of the various parts passes through this hollow sleeve.

The lower part 4 rests upon an axle 7 through the intermediary of plate springs 8 fixed at or near their central portions 9 to the axle and connected at their two extremities with the outer arms of a pair of bell-crank levers 10 pivoted on the said lower part 4. The free ends of the inner arms of the two levers 10 are united by means of a rod 11.

The motor mechanism comprising a motor 12, change speed gear 13 and differential 18, and the radiator 14 and gasoline and oil tanks, are supported on an under-frame 15 suspended from the lower part 4. The main shaft 16 of the motor is parallel with the axle and transmits its motion by toothed gearing to the primary shaft 17 of the change speed gear.

On each side of the differential 18 is a transverse shaft 19 each of which is provided at each end thereof with a universal joint 20. The joints on the opposite side to the differential unite the shafts 19 with the axles 21 of wheels 22 which are loosely mounted on said axles interdependent with the axle 7.

This suspension permits the transverse shafts 19 to be always maintained in the same plane.

It will be seen that the device according to the present invention can be applied to all kinds of motors with horizontal, vertical or inclined cylinders. The motor shaft can be parallel or perpendicular to the axle. The motor, differential and change speed gear can be supported on one frame or on separate frames. In the example given internal combustion engines have been referred to, but it is evident that the device forming the object of the invention can be also applied to a steam motor with an instantaneous vaporization boiler.

The axle may be of any convenient form depending upon the mode of suspension adopted for the mechanism.

The driving gear may be cylindrical or conical and be placed between the shafts 19 and the differential or at the two ends of the shafts 19.

I claim as my invention:—

In a motor vehicle front truck, a fixed member secured to the frame; a revoluble member associated with the fixed member; an axle; supporting springs connecting the ends of the axle and the revoluble member; a pair of steerable wheels having their axles movably mounted in the ends of the first named axle; a sub-frame secured to said revoluble member; a motor unit mounted directly on and secured to the sub-frame and comprising a motor, a change-speed gear operated thereby and a differential operated by the change-speed gear; and a pair of shafts disposed at opposite sides of the differential and having universal joint connections with the latter at their inner ends, and with the wheel axles at their outer ends.

In testimony whereof I affix my signature.

SYLVAIN COULIER.

Witnesses:
  FIRMIN HAVEN,
  LEONARD LERA.